United States Patent [19]
Gervais et al.

[11] 3,847,556
[45] Nov. 12, 1974

[54] SCREW MACHINING MATERIAL

[75] Inventors: Edouard Gervais, Montreal, Quebec; Pierre Chollet, Pierrefonds, Quebec; Robel Ranger, Perrot, Quebec, all of Canada

[73] Assignee: Noranda Mines Limited, Toronto, Ontario, Canada

[22] Filed: Feb. 12, 1973

[21] Appl. No.: 331,860

Related U.S. Application Data

[62] Division of Ser. No. 205,581, Dec. 7, 1971, Pat. No. 3,748,188.

[52] U.S. Cl. ............................. 29/187, 75/178 AM
[51] Int. Cl. ............................................ B21c 1/00
[58] Field of Search ................. 75/178 AM; 29/187

[56] References Cited
UNITED STATES PATENTS

| | | |
|---|---|---|
| 3,734,785 | 5/1973 | Watson et al. ............ 75/178 AM X |
| 1,945,288 | 1/1934 | Morell ........................... 75/178 AM |
| 3,567,436 | 3/1971 | Isobe et al. .................... 75/178 AM |
| 3,720,510 | 3/1973 | Isobe et al. .................... 75/178 AM |

Primary Examiner—Winston A. Douglas
Assistant Examiner—O. F. Crutchfield
Attorney, Agent, or Firm—Cooper, Dunham, Clark, Griffin & Moran

[57] ABSTRACT

A screw machining material consisting of Zn, Al, Cu and Mg is produced by alloying these elements in predetermined proportions, then continuously or semi-continuously casting the alloy into billets while offsetting its cracking tendency, then extruding such billets into rods, and finally drawing the obtained rods up to the final screw machining size. Such material can optionally be heat treated to improve its dimensional stability. The articles screw machines from this material may be suitably plated resulting in an excellent final product.

8 Claims, 5 Drawing Figures

SCREW MACHINING MATERIAL

This is a division, of application Ser. No. 205,581 filed Dec. 7, 1971, now U.S. Pat. No. 3748188.

BACKGROUND OF THE INVENTION

1. Field of the Invention

This invention relates to a novel screw machining material and to the method of preparing same. It also relates to the finished screw machined products fabricated from said material. More particularly, the invention relates to alloys containing zinc, aluminum, copper and magnesium, which are suitably treated to impart thereto satisfactory screw machining properties, i.e. good dimensional stability and adequate chip forming characteristics.

2. Description of the Prior Art

It is known to use zinc-aluminum alloys, containing minor proportions of copper and magnesium, for die casting and bearing purposes. For example, U.S. Pat. No. 1,945,288 of Pascal J. Morell issued Jan. 30, 1934 describes zinc base alloys containing about 15 to 35% Al, 0.01 to 0.2% Mg and eventually 0.01 to 5% Cu as particularly suitable for die casting. German Patent No. 974,460 of Dec. 29, 1960, issued to Erich Gebhardt, describes and claims an alloy containing from 28 to 35% Al, 0.1 to 5% Cu and eventually 0.02 to 0.3% Mg, the balance being Zn, as a good bearing material. However, up to now, zinc-aluminum alloys could not be successfully used for screw machining purposes because of inadequate chip forming characteristics. As is well known, it is essential during screw machining to promote formation of chips which are brittle or fragmenting or which possess a desirable spiral shape and which would fall off without interfering with the free machining operation. This could not be achieved with presently known zinc-aluminum alloys.

The closest attempt towards this goal appears to have been made by Herbert Winter in U.S. Pat. No. 2,102,869 of Dec. 21, 1937 where he describes treatment of extruded alloys consisting of 10 to 15% Al, 1.5 to 4% Cu and 0.01 to 0.04% Mg, the balance being Zn of at least 99.98% purity, on automatic lathes at speeds of 800 R.P.M. The modern day screw machining operation involves, however, speeds between about 2,000 and 10,000 R.P.M. and Winter's extruded alloys have proven to be inadequate for such treatment.

In view of this state of affairs, there are no screw machining zinc-aluminum alloys on the market which could compete with other free machining materials such as steel, aluminum or brass.

SUMMARY OF THE INVENTION

It has now been surprisingly found that zinc-aluminum alloys having about 20 to 35% Al, 4 to 10% Cu and a positive amount of Mg up to about 0.2 percent, the rest being Zn, when properly cast, then extruded and then drawn, produce a material which is well suited for present day screw machining operations. This material can be even further improved by an appropriate heat treatment and the resulting screw machined articles can be suitably plated to form a product which will favourably compete with screw machined parts now on the market.

It is accordingly a primary object of the present invention to produce a screw machining material in the following manner:

a. alloying a composition having about 20 to 35 percent by weight of aluminum, 4 to 10 percent by weight of copper and a positive amount of up to about 0.2 percent by weight Mg, the rest being Zn, apart from incidental impurities;

b. casting the obtained alloy continuously or semi-continuously into billets with a cooling action to promote solidification and arresting said cooling action before the billet cross-section is completely solidified, whereby cracking tendency of the alloy is offset and an adequate billet surface finish for extrusion purposes is achieved at industrially acceptable casting speeds;

c. extruding the cast billets into rods suitable for drawing; and d. drawing said extruded rods up to the final size of workpieces suitable for screw machining. The drawing is preferably effected with a reduction in size of up to about 50 percent with a particularly suitable range being between 10 and 30 percent.

A particularly preferred alloying composition for screw machining purposes in accordance with the present invention comprises 24 to 26% Al, 4.5 to 5.5% Cu and 0.02 to 0.06% Mg, the rest being Zn, apart from incidental impurities. Such alloys should preferably be prepared from good quality metals such as special high grade zinc, aluminum of 99.5 percent purity or better, electrolytic copper or good quality copper scrap and commercial grade magnesium.

A further object of the present invention involves screw machining the material obtained as mentioned above to produce screw machined objects or articles and eventually plating the same so as to obtain a final product of good quality.

BRIEF DESCRIPTION OF THE DRAWINGS

The invention will now be described with reference to the appended drawings in which.

DESCRIPTION OF THE PREFERRED EMBODIMENTS

Figure 1:
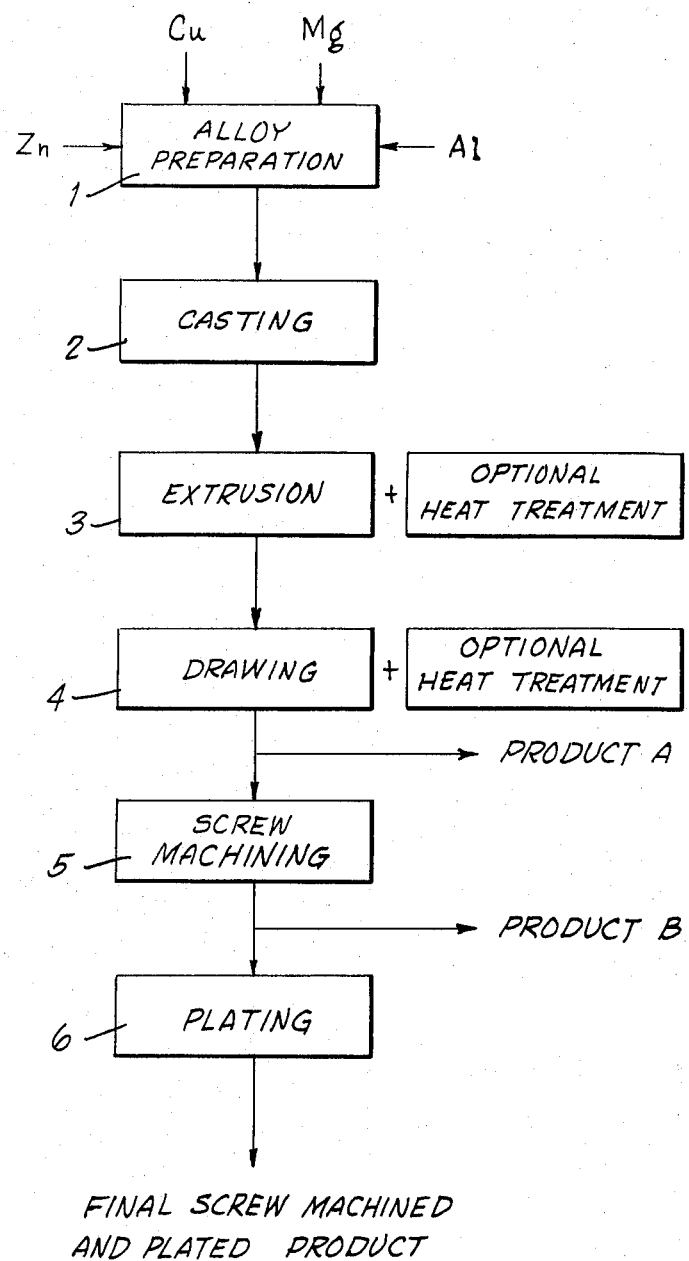
FIG. 1 represents a diagrammatic illustration of the various steps of the method according to the present invention.

As illustrated in FIG. 1, the invention comprises first of all the preparation of an alloy from zinc, aluminum, copper and magnesium constituents in predetermined proportions already indicated above. This is done as step 1 of the operation and it is preferable to use commerically pure metal constituents for this purpose, although the invention is not limited to the purity of the ingredients employed and a man of the art will have no difficulty to select appropriate purity to achieved a desired result.

Any suitable alloying procedure may be employed, although the following procedure is recommended when only one furnace is used: it is preferred to melt the aluminum first, since aluminum does not dissolve readily in molten zinc; copper may be charged with the aluminum or added to it when the aluminum is all molten but before adding the zinc; when all the aluminum and copper are molten, then zinc should be added; magnesium should be added just before casting.

The aluminum-copper melt obtained before the addition of zinc should not be superheated, to avoid excessive hydrogen pick-up and dross formation and as zinc is added, the melt temperature should be brought down substantially to the casting temperature. When zinc is added to such aluminum-copper melt, the zinc slab will sink and dissolve quickly drawing heat from the melt. The reason for adding magnesium preferably just before casting is due to its quick dissolution. Also, due to its density, the magnesium is submerged in the melt using a basket.

Although the above procedure is a preferred one, other procedures could well be used by men familiar with the art to achieve satisfactory alloy preparation.

When the alloy has been prepared, it is cast according to step 2 into billets or desired diameter; the casting should be done continuously or semi-continuously with proper control of the cooling of the billet during the casting operation to offset the cracking tendency of these zinc-aluminum alloys while maintaining acceptable surface finish for subsequent extrusion as well as a good casting rate. This control is achieved by stopping or arresting the cooling action before the billet cross-section is completely solid.

Figure 2:
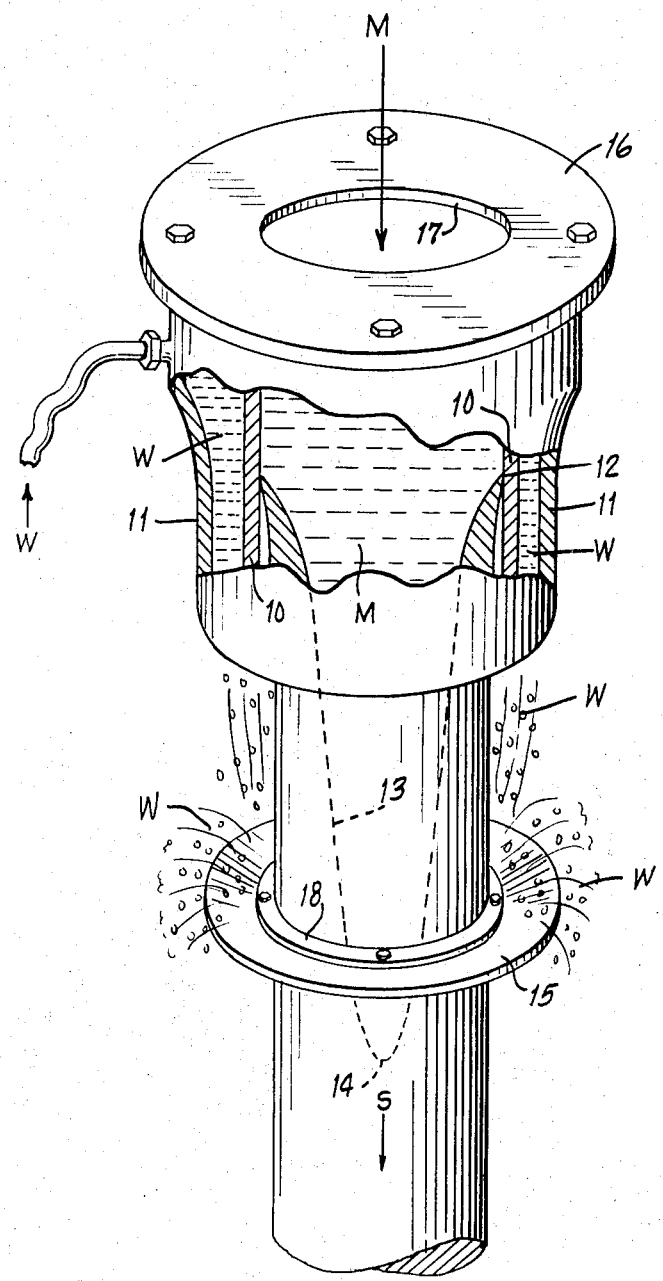
FIG. 2 is a generally schematical, longitudinal, partly sectional view of a mould arrangement that may be used according to the present invention.

FIG. 2 schematically illustrates one way of obtaining this result. As shown in this figure, molten metal M is introduced into an open top mould 10 and cooling water W into a jacket 11 surrounding said mould 10. Due to the cooling action of this water, the metal commences to solidify at a predetermined point 12 within the mould starting at the edges and continuing as shown by line 13 to a point 14 where the entire billet becomes a solid substance S. In accordance with the present invention, the cooling of the billet coming out of mould 10 may be stopped by using a water stripper 15 at a level above the full solidification point 14. Thus, cooling water which falls down from the jcket 11 onto the surface of the billet which comes out from mould 10 is stripped off by stripper 15 which thereby arrests the cooling action at that level before the solidification of the billet is complete.

The mould arrangement shown in FIG. 2 is, however, not limitative and other suitable arrangements may be used although there must be a provision to arrest the cooling of the billet prior to full solidification thereof to achieve satisfactory properties for subsequent fabrication steps. In the arrangement shown in FIG. 2, there is also illustrated a closure 16 for the mould having an opening 17 for the introduction of the molten metal. The closure may be suitably bolted to separate the different compartments within the jacketed mould and also for support on a suitable platform (not shown) or the like.

Figure 3:
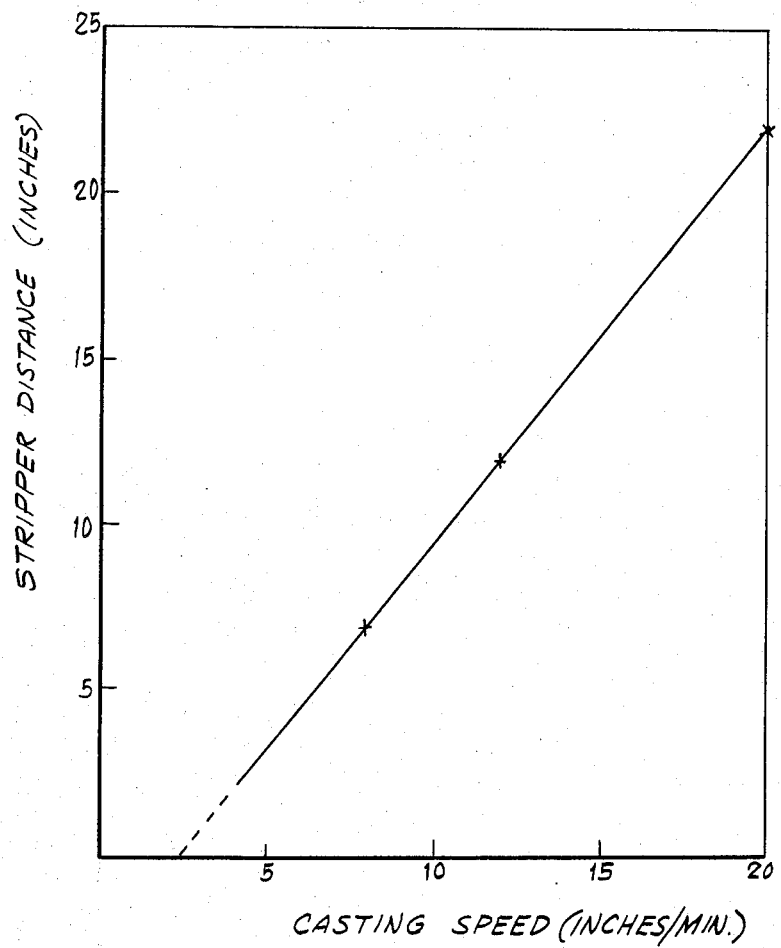
FIG. 3 is a graph showing the relationship between stripper distance and the casting speed in the mould arrangement according to the present invention.

The cooling water which falls down from the jacket 11 which is open at its bottom end cools the billet for a relatively short period of time after it has emerged from the mould and then this cooling water is stripped off by stripper 15 which may be made of a suitable material such as hard rubber and suitably attached by an annular supporting means 18 the height of which with respect to the mould is adjustable. This permits to control the distance of the stripper from the mould in desired manner. In this regard, FIG. 3 shows the relationship between the casting speed and the stripper distance from the mould for casting an 8 inch diameter billet. Generally speaking, the farther away is the stripper, the faster is the casting operation. However, faster is the casting operation, higher is the tendency of the emerging billet to crack. A man of the art will therefore have to adjust the height of the stripper to the desired conditions depending on many factors such as the composition of the alloy, the diameter of the cast billet, the casting method used, the cooling conditions employed, and so forth. These, however, are normal things for the man of the art to do. It has been found, however, that casting speed of up to 20 inches per minute and over can easily be adapted to the procedure in accordance with the present invention. On the other hand, as shown in FIG. 3, one could arrest the cooling in the mould proper without using the stripper, at casting speeds of about 2 inches per minute. This can be achieved by providing, for example, the jacket containing the cooling water with a closed bottom. However, from industrial viewpoint, such speeds are much too low and consequently not attractive. It is therefore by far preferable, in accordance with the present invention, to water cool the billet directly upon its emergence from the mould and then strip off the cooling water at a predetermined distance from the mould, before complete solidification of the billet takes place.

Referring now back to FIG. 1, the next step in the overall process is extrusion 3 of the cast billet into rods suitable for drawing. This extrusion procedure can be done in conventional manner at suitable extrusion ratios and lubrication conditions. The important thing is to obtain a rod of satisfactory dimensions for drawing and eventually screw machining purposes. For example, it has been found that a billet soaking at 250°C with extrusion at about 250°C through a flat face die under lubrication has produced a good combination of extrusion conditions in terms of extrusion pressure and speeds. With an extrusion ratio of 58 to 1 under lubrication at 250°C and at speeds of 60 feet per minute, very satisfactory rods have been obtained.

The obtained rods are then drawn in step 4. The rods are thus drawn to their final screw machining size. Generally, it is recommended that the rods be given not more than one or two passes at 10 to 20 percent reduction per pass, although this is not limitative.

The above combination of steps on the alloys having the composition identified previously produces a material which is called product A and which is suitable for screw machining. However, this material may further be improved, particularly with respect to its dimensional stability and its creep resistance, by subjecting it to a suitable heat treatment. Such optional heat treatment is generally effected after the extrusion step 3 or during the drawing step 4. Several heat treatments are known for zinc-aluminum alloys and they can be applied with various degrees of improvement. It has been found, however, that a particularly suitable heat treatment that will produce a gain in dimensional stability, increase in creep resistance and adequate chip forming characteristics, consists in homogenizing the alloy at a temperature of about 275° to 300°C, particularly about 290°C, then slow cooling the alloy to about 250°C at a cooling rate of approximately 0.5 to 2°C per minute and finally air cooling from 250°C to ambient temperature. A similar heat treatment procedure is already described in applicant's copending Canadian patent application No. 118,721 dated July 21, 1971.

Figure 4:
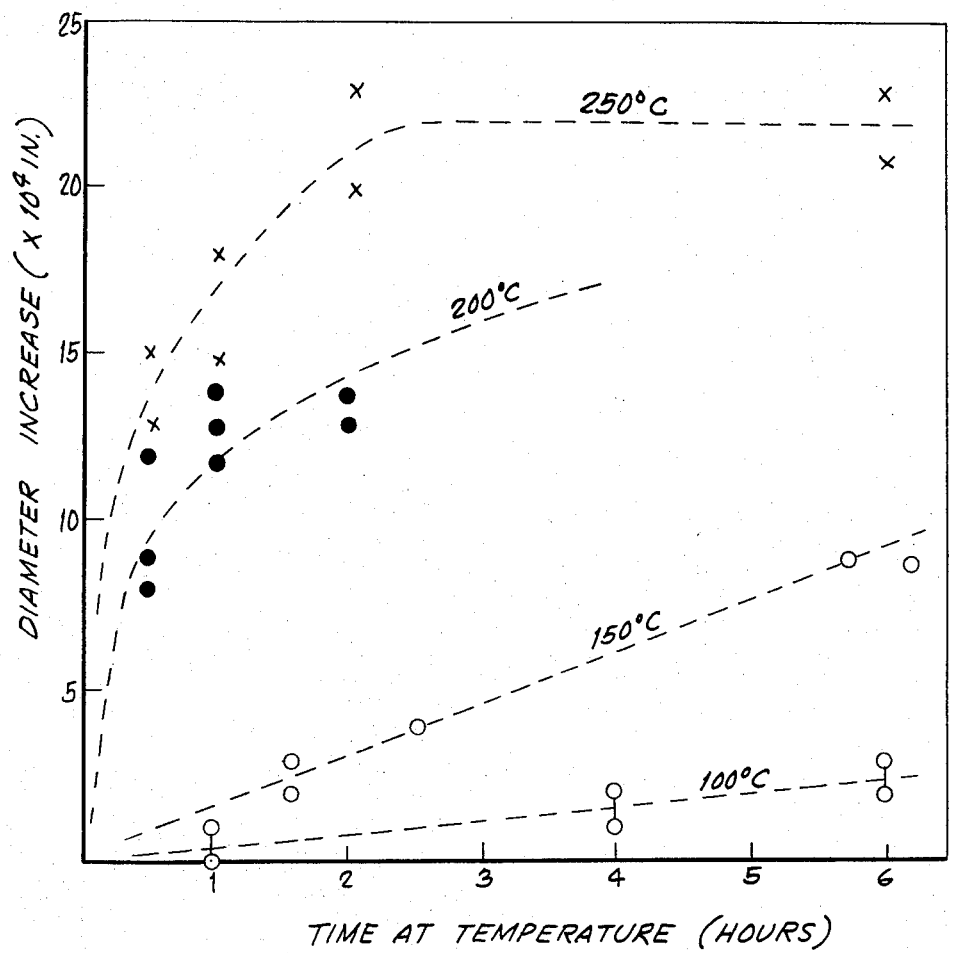
FIG. 4 is a graphical representation of the effect of time and temperature on the diameter of extruded and drawn rods in one of the optional heat treatment embodiments of this invention.

Another way of heat treating the alloy would be to heat the same at a temperature not greater than the eutectoid temperature (approximately 275°C) and maintain it at that temperature until it becomes dimensionally stable, whereafter it is air-cooled to ambient temperature. The time required to reach dimensional stability depends, besides the heat treatment temperature, on the rod prior history and composition, i.e. billet size, casting conditions, soaking temperature and period, extrusion conditions, extruded rod size and so on. FIG. 4 shows the effect of time (in hours) at a predetermined temperature on the diameter of extruded and cold drawn by 31 percent rods containing Zn, 25.4% Al, 4.75% Cu and 0.04% Mg. The billet diameter was 3.25 inches, the extrusion temperature 250°C with an extrusion ratio of 58:1. The graph demonstrates that the alloy, under the above conditions, undergoes a diameter increase of about 0.6 percent before it is dimensionally stable. Full stability is reached when the rod is maintained at 250°C for 2 to 3 hours. The chip forming characteristics of the alloy are not impaired by such heat treatment.

Figure 5:
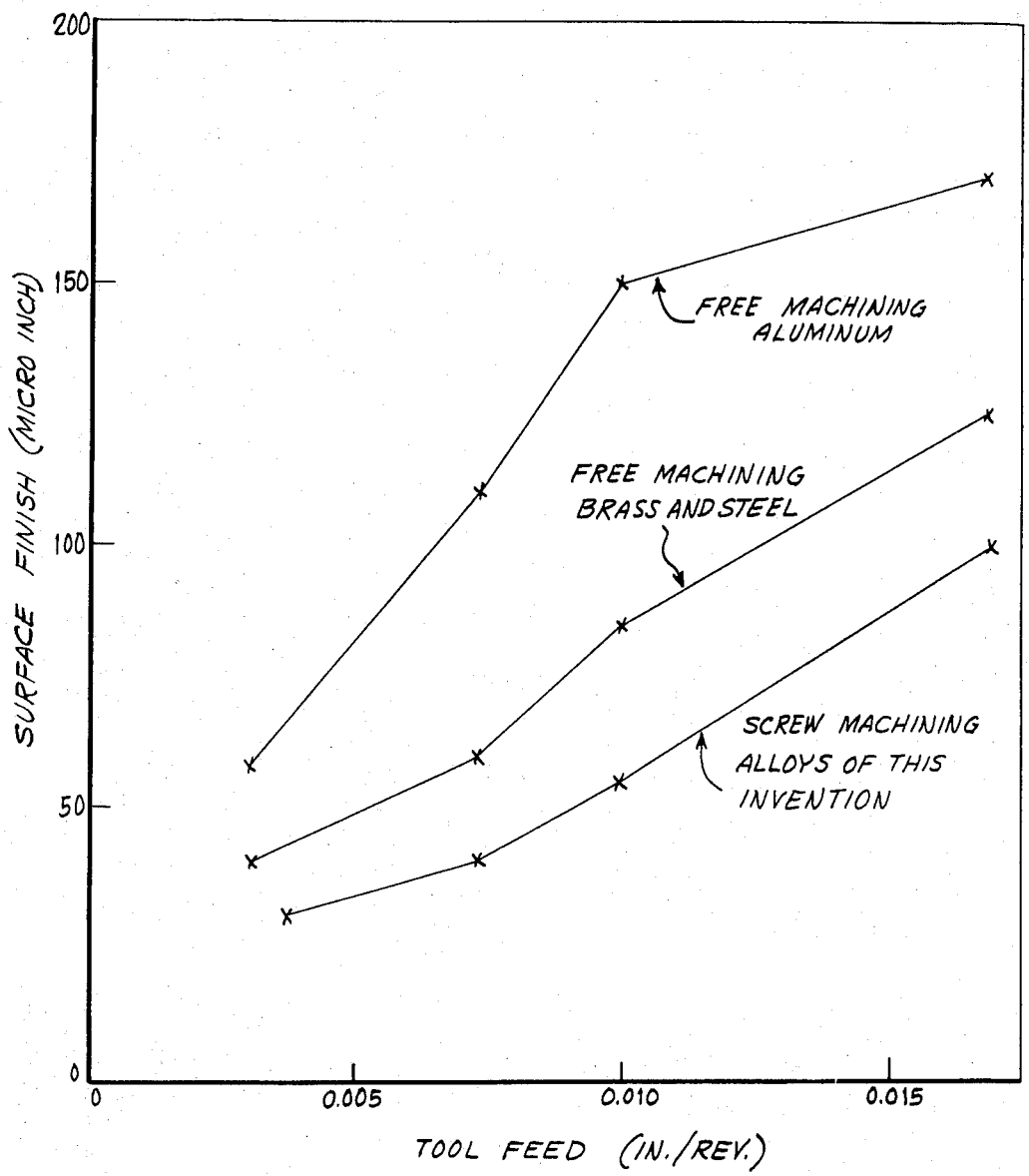
FIG. 5 is a comparative graphical representation of surface finish with respect to the tool feed and type of alloys used in screw machining operation.

The screw machining operation shown in step 5 of FIG. 1 can be carried out in any conventional manner. Generally speaking, however, best results and most fragmented chips will be achieved with highest possible feed rates. On the other hand, the feed selection should be compatible with the surface finish and dimensional accuracy requirements. FIG. 5 illustrates the surface finish as a function of tool feed rate, in inches per revolution. The surface finish produced by the turning tool was measured with a calibrated Phillips roughness meter with an accuracy of ±20 percent. The turning tool and machining conditions were the same for all materials tested. The graph indicates that for a given surface finish, the zinc-aluminum alloys of the present invention can be machined two to three times faster than the free machining aluminum and approximately 20 percent faster than the free machining brass and steel. The machine was easily operated at spindle speeds above 2,000 rpm.

As a specific, non limitative, example, a material made of an alloy containing Zn, 25% Al, 5% Cu and 0.05% Mg was screw machined at a spindle speed of 3,085 rpm, using a feed of 0.0073 in./rev. and yielded fragmented chips of ¼ to 1 in. size. The characteristics of the turning operation were:
  depth of cut: 0.05 in.
  tool back and side rake angles: 5°
  clearance angles: 10°
  tool centered on rod
  nose radius: nil (i.e. sharp edge).

The above data are, of course, in no way limitative and generally screw machined articles in accordance with the present invention have been found to possess excellent properties. These articles are identified in FIG. 1 as product B which can be marketed as such.

Finally, the obtained screw machined articles may be subjected to a plating operation in step 6 to yield the final screw machined and plated product. In this regard, zinc alloys containing a relatively large amount of aluminum are known to be difficult to plate. Although within the scope of the present invention, any suitable plating operation is intended to be included, it is well known that zinc-aluminum alloys, when plated on standard zinc die casting plating line, produce a plating that will usually be blistered and will not be highly adherent.

It has now been found that the products of the present invention can be excellently plated by somewhat modifying the pre-plating procedure of the standard zinc die casting plating cycle. The new pre-plating procedure is characterized by the etching of the article in a sodium hydroxide-sodium fluoride solution prior to the copper strike. This etching operation has been found particularly suitable for the products obtained in accordance with the present invention and produces a plated article which will not blister, the plating of which will be adherent and the plated part will pass the A.S.T.M. CASS and Corrokote tests as well as any plated zinc die casting. The new cleaning and etching procedure prior to plating is the following:

1. Conventional surface preparation (e.g. buffing, polishing and/or deburring, although in some instances these procedures may be omitted);
2. Degreasing with a cleaner to remove all dirt, grease and buffing compounds;
3. Rinsing (preferably about 1 minute in hot water followed by 1 minute in cold water);
4. Immersing the article in a sodium hydroxidesodium fluoride aqueous solution containing about 2.5 g./l. to 10 g./l., preferably 5 g./l. g./l. sodium hydroxide and 2.5 g./l. to 10 g./l., preferably 5 g./l. – 6 g./l. sodium fluoride (preferably for 2 minutes at room temperature with agitation);
5. Rinsing (preferably about 4 minutes in a flowing stream of cold water);
6. Applying a copper strike (e.g. a copper cyanide strike).

After the copper strike, the usual copper plating, nickel plating and chromium plating operations can be carried out in conventional manner.

The above-mentioned procedure for cleaning and etching differs from the standard zinc die casting practice by eliminating the "anodic cleaning" and by changing the nature of the chemical etching solution in step 4. The sodium hydroxide-sodium fluoride solution must be kept in a container which will not be attacked thereby, such as a PVC container.

The final screw machined and plated product has excellent properties and compares very favourably with the screw machined parts now on the market. It should also be noted that the various operations shown in FIG. 1 and described above are not difficult to accomplish and can be carried out continuously one after the other at industrially acceptable speeds, leading to a product which will be produced without complex and expensive operations or devices.

The effect of the alloy composition is an important one on good chip formation behaviour and keeping the various alloying elements within the proportions indicated above is an important feature of the invention. For example, magnesium additions are essential from the point of view of screw machining and strength properties. Also, copper level of less than 4 percent is not sufficient to promote the formation of short and brittle chips during screw machining and preferably amounts in excess of 4 percent should be used.

The following examples illustrate the importance of the alloy composition:

EXAMPLE 1

The following alloy compositions were prepared and treated in accordance with the present invention and their screw machining properties were investigated:

| Test No. | Al | Alloy Composition Cu | Mg | Zn |
|---|---|---|---|---|
| 1 | 19.6 | 1.1 | — | rest |
| 2 | 25.6 | 1.0 | — | do. |
| 3 | 22.0 | 2.7 | — | do. |
| 4 | 25.6 | 3.3 | — | do. |

It has been found that these alloys did not produce satisfactory screw machining properties.

EXAMPLE 2

The following alloys have been prepared and treated in accordance with the present invention and the resulting products were investigated with respect to their screw machining properties:

| Test No. | Al | Alloy Composition Cu | Mg | Zn |
|---|---|---|---|---|
| 5 | 21.1 | 1.43 | 0.039 | rest |
| 6 | 25.4 | 1.0 | 0.037 | do. |
| 7 | 22.0 | 3.3 | 0.042 | do. |
| 8 | 25.3 | 3.2 | 0.039 | do. |
| 9 | 22.1 | 2.75 | 0.054 | do. |
| 10 | 24.9 | 4.17 | 0.057 | do. |
| 11 | 26.3 | 5.10 | 0.06 | do. |
| 12 | 24.9 | 10.2 | 0.05 | do. |

It has been found that only products of tests 10, 11 and 12 possessed satisfactory screw machining properties. This illustrates the effect on the screw machining behaviour of the copper content and the necessity for the presence of magnesium.

EXAMPLE 3

The following alloys were prepared and treated in accordance with the present invention to test the effect of the aluminum content on the screw machining properties:

| Test No. | Al | Alloy Composition Cu | Mg | Zn |
|---|---|---|---|---|
| 13 | 10.0 | 4.91 | 0.055 | rest |
| 14 | 19.4 | 4.98 | 0.035 | do. |
| 15 | 32.8 | 5.17 | 0.057 | do. |

Alloy 13 has been found unsatisfactory, alloy 14 barely acceptable and alloy 15 entirely satisfactory.

EXAMPLE 4

The following alloy compositions have been prepared, treated in accordance with the present invention and investigated with respect to their screw machining properties:

| Test No. | Al | Alloy Composition Cu | Mg | Zn |
|---|---|---|---|---|
| 16 | 24.4 | 5.13 | 0.013 | rest |
| 17 | 24.1 | 5.14 | 0.031 | do. |
| 18 | 24.6 | 5.13 | 0.12 | do. |

All these alloys have been found to possess satisfactory screw machining properties.

EXAMPLE 5

The following alloy compositions, known in the art, have been prepared, treated in accordance with the present invention and their screw machining properties have been investigated:

| Test No. | Al | Alloy Composition Cu | Mg | Zn |
|---|---|---|---|---|
| 19 | 12.8 | 0.80 | 0.022 | rest |
| 20 | 14.8 | 3.95 | 0.04 | do. |

The screw machining properties of these two alloys have been found unsatisfactory.

It is clear, therefore, that a proper selection of the alloying composition, which is subjected to a predetermined treatment of casting, then extrusion and then drawing, will result, in an entirely unobvious manner, in a material which is suitable for screw machining purposes. The material can be heat treated and plated to produce a final product which will favourably compete with screw machined products now on the market. It is therefore believed that an important advance in the art has been achieved. The various steps and operations to produce the desired results are simple and efficient and can be carried out at high speeds. It should be noted, however, that the specific embodiments described, illustrated and exemplified above are not limitative in nature and that many modifications obvious to those skilled in the art can be made without departing from the spirit of the present invention and the scope of the following claims.

We claim:

1. Alloy having adequate dimensional stability and chip forming characteristics for screw machining purposes, consisting essentially of 20 to 35 percent by weight aluminum, 4 to 10 percent by weight copper and a positive amount of up to about 0.2 percent by weight magnesium, the rest being zinc apart from incidental impurities.

2. Alloy according to claim 1, consisting essentially of 24 to 26 percent by weight aluminum, 4.5 to 5.5 percent by weight copper and 0.02 to 0.2 percent by weight magnesium, the rest being zinc, apart from incidental impurities.

3. Rods suitable for screw machining formed of the alloy according to claim 1, which alloy has been cast into billets having adequate surface finish, then extruded into rods which are then drawn up to the final screw machining size.

4. Rods according to claim 3, which have been drawn up to about 50 percent reduction in size relative to the extruded rods.

5. Rods according to claim 4, which have been drawn to between 10 and 30 percent reduction in size relative to the extruded rods.

6. Rods according to claim 3, which have been heat treated to further improve their dimensional stability.

7. Rods according to claim 3, which are screw machined to form a desired screw machined part which is subsequently plated.

8. Rods according to claim 6, which are screw machined to form a desired machined part which is subsequently plated.

* * * * *

UNITED STATES PATENT OFFICE
CERTIFICATE OF CORRECTION

Patent No. 3,847,556    Dated November 12, 1974

Inventor(s) Edouard Gervais et al

It is certified that error appears in the above-identified patent and that said Letters Patent are hereby corrected as shown below:

Title Page: Under the listing of inventors, the third co-inventor should correctly read:
-- Robert Ranger, Ile Perrot --

Under Abstract "machines" should correctly read -- machined --

Column 3, line 46, "jcket" should correctly read -- jacket --

Column 6, lines 29 and 30 "hydroxidesodium" should correctly read -- hydroxide-sodium -- line 31 should correctly read:
-- about 2.5 g./l. to 10 g./l., preferably 5 g./l. - 6 g./l. so-   --

Claim 8, line 3, after "desired" the word -- screw -- should be inserted

Signed and sealed this 4th day of February 1975.

(SEAL)
Attest:

McCOY M. GIBSON JR.
Attesting Officer

C. MARSHALL DANN
Commissioner of Patents